US012684241B2

(12) United States Patent
Liu

(10) Patent No.: US 12,684,241 B2
(45) Date of Patent: Jul. 14, 2026

(54) MULTI-VIEW DISTANCE MEASUREMENT METHOD AND ELECTRONIC DEVICE

(71) Applicant: Huawei Technologies Co., Ltd., Shenzhen (CN)

(72) Inventor: Chang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/913,778

(22) Filed: Oct. 11, 2024

(65) Prior Publication Data

US 2025/0039549 A1 Jan. 30, 2025

Related U.S. Application Data

(63) Continuation of application No. PCT/CN2023/086576, filed on Apr. 6, 2023.

(30) Foreign Application Priority Data

Apr. 14, 2022 (CN) .......................... 202210389020.7

(51) Int. Cl.
*H04N 23/695* (2023.01)
*H04N 23/90* (2023.01)

(52) U.S. Cl.
CPC ........... *H04N 23/695* (2023.01); *H04N 23/90* (2023.01)

(58) Field of Classification Search
CPC ............. G06T 2207/30244; G06T 7/74; G06T 2200/08; G06T 7/73; G06T 19/006; G06T 7/337; G06T 15/10; G06T 17/05; G06T 2207/10012; G06T 2207/10016; G06T 2207/20021
USPC ........................................................ 348/148
See application file for complete search history.

(56) References Cited

U.S. PATENT DOCUMENTS

| | | | | |
|---|---|---|---|---|
| 11,190,689 B1 * | 11/2021 | Wang | ................... | H04N 23/683 |
| 2021/0125370 A1 * | 4/2021 | Wang | ....................... | G06T 7/74 |

FOREIGN PATENT DOCUMENTS

| | | | |
|---|---|---|---|
| CN | 105882524 A | | 8/2016 |
| CN | 109887003 A | | 6/2019 |
| CN | 110077349 A | | 8/2019 |
| CN | 209514066 U | | 10/2019 |
| CN | 109887003 B | * | 11/2021 |

OTHER PUBLICATIONS

"Get address description data," URL: https://lbs.amap.com/api/ android-sdk/guide/map-data/geo, Mar. 19, 2024, with English translation total 7 pages.

* cited by examiner

*Primary Examiner* — Masum Billah
(74) *Attorney, Agent, or Firm* — Conley Rose, P.C.

(57) ABSTRACT

In a multi-view distance measurement method, an appropriate relative pose is selected from a plurality of preset relative poses based on driving information. Then relative poses of cameras are adjusted, so that a distance measurement capability of the camera matches a region of interest, to implement distance measurement.

20 Claims, 13 Drawing Sheets

Object 4

Camera 1

Camera 2

Camera 1

Camera 2

Covisibility image

Image obtained by the camera 1

Image obtained by the camera 2

MULTI-VIEW DISTANCE MEASUREMENT METHOD AND ELECTRONIC DEVICE

CROSS-REFERENCE TO RELATED APPLICATIONS

This is a continuation of Int'l Patent App. No. PCT/CN2023/086576, filed on Apr. 6, 2023, which claims priority to Chinese Patent App. No. 202210389020.7, filed on Apr. 14, 2022, which are incorporated by reference.

TECHNICAL FIELD

This disclosure relates to the field of electronic technologies, and in particular, to a multi-view distance measurement method and an electronic device.

BACKGROUND

With development of autonomous driving technologies, an electronic device, for example, a vehicle, is usually configured with sensors such as a lidar and a camera, to assist a driver in driving the vehicle.

If the electronic device, for example, the vehicle, is configured with multi-view cameras, a distance between an object and the electronic device, for example, the vehicle, may be measured. However, if relative poses of the multi-view cameras configured on the electronic device, for example, the vehicle, are fixed, the multi-view cameras cannot meet precision requirements for distances in different scenarios at the same time. A pose includes a position and a posture. The position is used to describe a spatial position relationship between cameras considered as mass points, and the posture is used to describe rotation and/or an orientation of the camera not considered as a mass point.

However, if the relative poses of the multi-view cameras on the electronic device, for example, the vehicle, change, after the relative poses of the multi-view cameras change, self-calibration needs to be performed on the multi-view cameras to determine different relative poses of the multi-view cameras, so that the distance between the object and the electronic device, for example, the vehicle, can be obtained. However, self-calibration usually depends on a specific calibration object, and cannot be performed in real time. As a result, after the relative poses of the multi-view cameras change, the distance between the object and the electronic device cannot be restored in an image in real time.

SUMMARY

Embodiments provide a multi-view distance measurement method and an electronic device, and relate to the field of electronic technologies. Because positions of regions of interest of an electronic device, for example, a vehicle, vary with different scenarios, a distance measurement capability of the electronic device needs to match the regions of interest at different positions. According to the multi-view distance measurement method provided in this disclosure, an appropriate relative pose is selected from a plurality of preset relative poses based on driving information, and then relative poses of cameras are adjusted, so that a distance measurement capability of the camera matches a region of interest, to implement distance measurement.

According to a first aspect, an embodiment provides a multi-view distance measurement method, applied to an electronic device including at least two cameras and a camera pose adjustment apparatus. The at least two cameras include a first camera and a second camera. The camera pose adjustment apparatus is configured to adjust a pose of at least one camera. The method includes determining a first relative pose from a plurality of relative poses based on driving information, where the driving information includes at least one of a speed, a gear, a traveling environment, and a driving mode, and the plurality of relative poses are preset, adjusting a pose of the first camera and/or a pose of the second camera to the first relative pose, and determining a first distance based on an image obtained by the first camera, an image obtained by the second camera, and the first relative pose, where the first distance is a distance between an object in a first region and the electronic device.

In the foregoing embodiment, the electronic device adjusts a relative pose of the camera based on the driving information, so that a distance measurement capability of the camera matches a region of interest, to determine the distance between the object and the electronic device.

With reference to some embodiments of the first aspect, in some embodiments, the determining a first relative pose from a plurality of relative poses based on driving information further includes determining a region of interest based on the driving information, and determining the first relative pose from the plurality of relative poses based on the region of interest.

In the foregoing embodiment, the electronic device first determines a region of interest, and selects a relative pose based on the region of interest. In addition, because the relative pose is selected from a plurality of pairs of known relative poses, relative poses of the cameras are known.

With reference to some embodiments of the first aspect, in some embodiments, the determining the first relative pose from the plurality of relative poses based on the region of interest further includes determining the first relative pose from the plurality of relative poses based on first correspondences and the region of interest. The first correspondences are preset on the electronic device. The first correspondences are correspondences between a plurality of detectable regions and the plurality of relative poses. A detectable region corresponding to the first relative pose includes the region of interest.

In the foregoing embodiment, there are correspondences between different regions of interest and different relative poses, and the electronic device may select an appropriate relative pose from the plurality of pairs of relative poses based on the correspondences.

With reference to some embodiments of the first aspect, in some embodiments, after the adjusting a pose of the first camera and/or a pose of the second camera to the first relative pose, and before the determining a first distance based on an image obtained by the first camera, an image obtained by the second camera, and the first relative pose, the method further includes updating the first relative pose.

In the foregoing embodiment, the electronic device may further update the first relative pose, to obtain a more accurate first relative pose through optimization.

With reference to some embodiments of the first aspect, in some embodiments, the updating the first relative pose further includes updating the first relative pose by using a matrix corresponding to the first relative pose as a projection matrix and minimizing a projection error.

In the foregoing embodiment, the electronic device may optimize the first relative pose by using the known first relative pose as an initial value and minimizing the projection error. Because the initial value is close to an optimal value, the initial value can be quickly converged to the optimal value.

According to a second aspect, an embodiment provides a multi-view distance measurement method, applied to an electronic device including at least two cameras and a camera pose adjustment apparatus. The at least two cameras include a first camera and a second camera. The camera pose adjustment apparatus is configured to adjust a pose of at least one camera. The method includes, if a speed of the electronic device is within a first range, adjusting relative poses of the first camera and the second camera to a first pose, where the first pose belongs to a plurality of relative poses, and the plurality of relative poses are preset, and if the speed of the electronic device is within a second range, adjusting the relative poses of the first camera and the second camera to a second pose, where the second pose belongs to the plurality of relative poses. If a lower limit of the first range is greater than an upper limit of the second range, a distance between a detectable region corresponding to the first pose and the electronic device is greater than a distance between a detectable region corresponding to the second pose and the electronic device.

In the foregoing embodiment, speeds of the electronic device are different, relative poses of the camera on the electronic device are different, and the relative pose is known. In this way, a distance measurement capability of the camera of the electronic device matches a requirement of the electronic device in different cases, to determine a distance between an object and the electronic device.

With reference to some embodiments of the second aspect, in some embodiments, an optical axis of the first camera is parallel to an optical axis of the second camera. The adjusting relative poses of the first camera and the second camera to a first pose further includes adjusting a baseline distance between the first camera and the second camera to a first distance, and the adjusting the relative poses of the first camera and the second camera to a second pose further includes adjusting the baseline distance between the first camera and the second camera to a second distance, where the first distance is greater than the second distance.

In the foregoing embodiment, if the optical axes of the two cameras are parallel, and the speeds of the electronic device are different, only the baseline distance between the cameras may be adjusted, so that the distance measurement capability of the camera of the electronic device matches the requirement of the electronic device in different cases. Only the baseline distance between the cameras needs to be adjusted, leading to a simple implementation and good robustness.

With reference to some embodiments of the second aspect, in some embodiments, a posture of the first camera is the same as a posture of the second camera.

In the foregoing embodiment, postures of the two cameras may be the same, or only the baseline distance between the cameras may be adjusted, so that the distance measurement capability of the camera of the electronic device matches the requirement of the electronic device in different cases.

According to a third aspect, an embodiment provides a multi-view distance measurement method, applied to an electronic device including at least three cameras. The at least three cameras include a first camera, a second camera, and a third camera. The method includes if a speed of the electronic device is within a first range, determining a distance between an object in a first region and the electronic device based on an image obtained by the first camera and an image obtained by the second camera, where relative poses of the first camera and the second camera are a first pose, the first pose corresponds to the first region, and the first region corresponds to the first range, and if the speed of the electronic device is within a second range, determining a distance between an object in a second region and the electronic device based on an image obtained by the first camera and an image obtained by the third camera, where relative poses of the first camera and the third camera are a second pose, the second pose corresponds to the second region, and the second region corresponds to the second range. The first range is different from the second range, and the first pose is different from the second pose.

In the foregoing embodiment, the electronic device has at least three cameras. If speeds of the electronic device are different, a distance between an object and the electronic device is determined based on images obtained by different cameras. Because relative poses of different pairs of cameras are different, and the relative pose is known, a distance measurement capability of the camera of the electronic device can match a requirement of the electronic device in different cases, to determine the distance between the object and the electronic device.

With reference to some embodiments of the second aspect, in some embodiments, optical axes of the first camera, the second camera, and the third camera are parallel. A baseline distance between the first camera and the second camera is a first distance, a baseline distance between the first camera and the third camera is a second distance, and if a lower limit of the first range is greater than an upper limit of the second range, the first distance is greater than the second distance.

In the foregoing embodiment, if a traveling speed of the electronic device is high, and the optical axes of the cameras on the electronic device are parallel, a pair of cameras with a large baseline distance is selected to obtain images, and the distance between the object and the electronic device is determined based on the obtained images; and if the traveling speed of the electronic device is low, a pair of cameras with a small baseline distance is selected to obtain images, and the distance between the object and the electronic device is determined based on the obtained images.

According to a fourth aspect, an embodiment provides an electronic device. The electronic device includes one or more processors, a memory, at least two cameras, and a camera pose adjustment apparatus. The at least two cameras include a first camera and a second camera. The camera pose adjustment apparatus is configured to adjust a pose of at least one camera. The memory is coupled to the one or more processors. The memory is configured to store computer program code. The computer program code includes computer instructions. The one or more processors invoke the computer instructions to enable the electronic device to: determine a first relative pose from a plurality of relative poses based on driving information, where the driving information includes at least one of a speed, a gear, a traveling environment, and a driving mode, and the plurality of relative poses are preset; adjust a pose of the first camera and/or a pose of the second camera to the first relative pose; and determine a first distance based on an image obtained by the first camera, an image obtained by the second camera, and the first relative pose, where the first distance is a distance between an object in a first region and the electronic device.

With reference to some embodiments of the fourth aspect, in some embodiments, the one or more processors are further configured to invoke the computer instructions to enable the electronic device to: determine a region of interest based on the driving information; and determine the first relative pose from the plurality of relative poses based on the region of interest.

With reference to some embodiments of the fourth aspect, in some embodiments, the one or more processors are further configured to invoke the computer instructions to enable the electronic device to determine the first relative pose from the plurality of relative poses based on first correspondences and the region of interest. The first correspondences are preset on the electronic device. The first correspondences are correspondences between a plurality of detectable regions and the plurality of relative poses. A detectable region corresponding to the first relative pose includes the region of interest.

With reference to some embodiments of the fourth aspect, in some embodiments, the one or more processors are further configured to invoke the computer instructions to enable the electronic device to update the first relative pose.

With reference to some embodiments of the fourth aspect, in some embodiments, the one or more processors are further configured to invoke the computer instructions to enable the electronic device to update the first relative pose by using a matrix corresponding to the first relative pose as a projection matrix and minimizing a projection error.

According to a fifth aspect, an embodiment provides an electronic device. The electronic device includes one or more processors, a memory, at least two cameras, and a camera pose adjustment apparatus. The at least two cameras include a first camera and a second camera. The camera pose adjustment apparatus is configured to adjust a pose of at least one camera. The memory is coupled to the one or more processors. The memory is configured to store computer program code. The computer program code includes computer instructions. The one or more processors invoke the computer instructions to enable the electronic device to: if a speed of the electronic device is within a first range, adjust relative poses of the first camera and the second camera to a first pose, where the first pose belongs to a plurality of relative poses, and the plurality of relative poses are preset; and if the speed of the electronic device is within a second range, adjust the relative poses of the first camera and the second camera to a second pose, where the second pose belongs to the plurality of relative pose. If a lower limit of the first range is greater than an upper limit of the second range, a distance between a detectable region corresponding to the first pose and the electronic device is greater than a distance between a detectable region corresponding to the second pose and the electronic device.

With reference to some embodiments of the fifth aspect, in some embodiments, an optical axis of the first camera is parallel to an optical axis of the second camera. The one or more processors are further configured to invoke the computer instructions to enable the electronic device to: adjust a baseline distance between the first camera and the second camera to a first distance; and adjust the baseline distance between the first camera and the second camera to a second distance, where the first distance is less than the second distance.

With reference to some embodiments of the fifth aspect, in some embodiments, a posture of the first camera is the same as a posture of the second camera.

According to a sixth aspect, an embodiment provides an electronic device. The electronic device includes one or more processors, a memory, and at least three cameras. The at least three cameras include a first camera, a second camera, and a third camera. The memory is coupled to the one or more processors. The memory is configured to store computer program code. The computer program code includes computer instructions. The one or more processors invoke the computer instructions to enable the electronic device to: if a speed of the electronic device is within a first range, determine a distance between an object in a first region and the electronic device based on an image obtained by the first camera and an image obtained by the second camera, where relative poses of the first camera and the second camera are a first pose, the first pose corresponds to the first region, and the first region corresponds to the first range; and if the speed of the electronic device is within a second range, determine a distance between an object in a second region and the electronic device based on an image obtained by the first camera and an image obtained by the third camera, where relative poses of the first camera and the third camera are a second pose, the second pose corresponds to the second region, and the second region corresponds to the second range. The first range is different from the second range, and the first pose is different from the second pose.

With reference to some embodiments of the sixth aspect, in some embodiments, optical axes of the first camera, the second camera, and the third camera are parallel. A baseline distance between the first camera and the second camera is a first distance, a baseline distance between the first camera and the third camera is a second distance, and if a lower limit of the first range is greater than an upper limit of the second range, the first distance is greater than the second distance.

According to a seventh aspect, an embodiment provides a chip system. The chip system is applied to an electronic device. The chip system includes one or more processors. The processor is configured to invoke computer instructions to enable the electronic device to perform the method according to any one of the first aspect, the second aspect, the third aspect, and the possible implementations of the first aspect, the second aspect, and the third aspect.

According to an eighth aspect, an embodiment of this application provides a computer program product including instructions. When the computer program product runs on an electronic device, the electronic device is enabled to perform the method according to any one of the first aspect, the second aspect, the third aspect, and the possible implementations of the first aspect, the second aspect, and the third aspect.

According to a ninth aspect, an embodiment provides a computer-readable storage medium, including instructions. When the instructions are run on an electronic device, the electronic device is enabled to perform the method according to any one of the first aspect, the second aspect, the third aspect, and the possible implementations of the first aspect, the second aspect, and the third aspect.

It may be understood that the electronic device provided in the fourth aspect, the fifth aspect, or the sixth aspect, the chip system provided in the seventh aspect, the computer program product provided in the eighth aspect, and the computer storage medium provided in the ninth aspect are all configured to perform the method provided in embodiments. Therefore, for beneficial effects that can be achieved by the electronic device, the chip system, the computer program product, and the computer storage medium, refer to beneficial effects of the corresponding method. Details are not described herein again.

DESCRIPTION OF EMBODIMENTS

Terms used in the following embodiments are merely intended to describe specific embodiments, but are not intended to limit this application. Terms "one", "a", "the", "the foregoing", "this", and "the one" of singular forms used in this specification of this application are also intended to include plural forms, unless otherwise specified in the context clearly. It should be further understood that the term "and/or" used in this application indicates and includes any or all possible combinations of one or more listed items.

The following terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The term "user interface" (UI) in the following embodiments is a medium interface for interaction and information exchange between an application or an operating system and a user, and implements conversion between an internal form of information and a form acceptable to the user. The user interface is source code written in a specific computer language, for example, Java or an Extensible Markup Language (XML). Interface source code is parsed and rendered on an electronic device, and is finally presented as content that can be identified by the user. The user interface is usually represented in a form of a graphical user interface (GUI), and is a user interface that is related to a computer operation and that is displayed in a graphic manner. The user interface may be a visual interface element, for example, a text, an icon, a button, a menu, a tab, a text box, a dialog box, a status bar, a navigation bar, or a Widget, that is displayed on a display of the electronic device.

For ease of understanding, the following first describes related terms and concepts in embodiments of this disclosure. Terms used in implementations of the present disclosure are merely intended to explain specific embodiments of the present disclosure, and are not intended to limit the present disclosure.

When a user drives another electronic device, for example, a vehicle, distances between a region of interest of the vehicle and the vehicle may be different based on different driving information.

Figure 1:
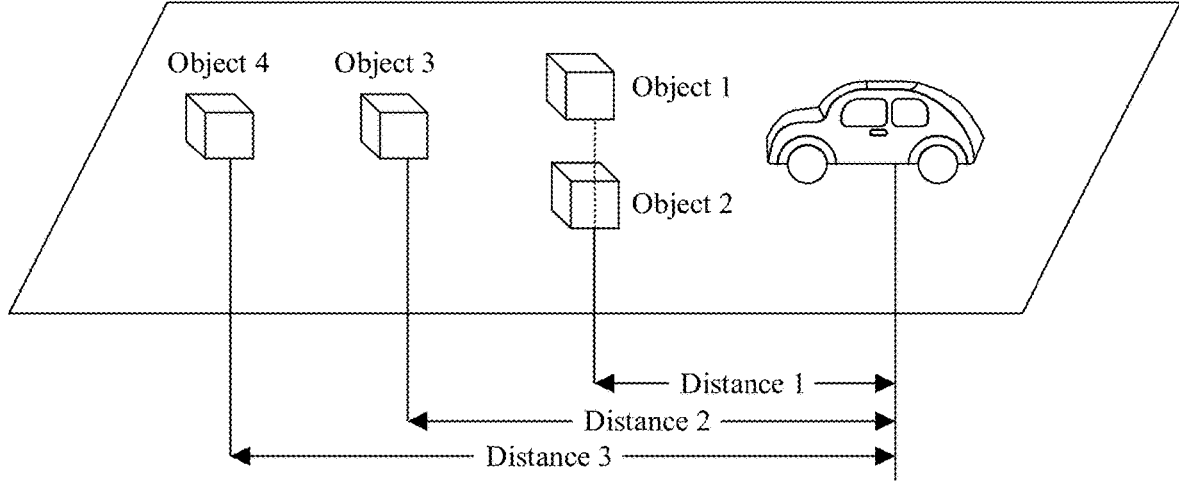
FIG. 1 is a diagram of an example of a scenario of a multi-view distance measurement method according to an embodiment.

FIG. 1 is a diagram of an example of a scenario of a multi-view distance measurement method according to an embodiment of this application.

As shown in FIG. 1, in a traveling direction of a vehicle, there are a plurality of objects: an object 1, an object 2, an object 3, and an object 4. Distances between the object 1 and the vehicle and between the object 2 and the vehicle are a distance 1. A distance between the object 3 and the vehicle is a distance 2. A distance between the object 4 and the vehicle is a distance 3. The distance 1 is less than the distance 2, and the distance 2 is less than the distance 3.

When a traveling speed of the vehicle is low, a region of interest of the vehicle does not include the object 3 and the object 4. On the contrary, when the traveling speed of the vehicle is high, the region of interest of the vehicle includes the object 3 and the object 4.

Figure 2:
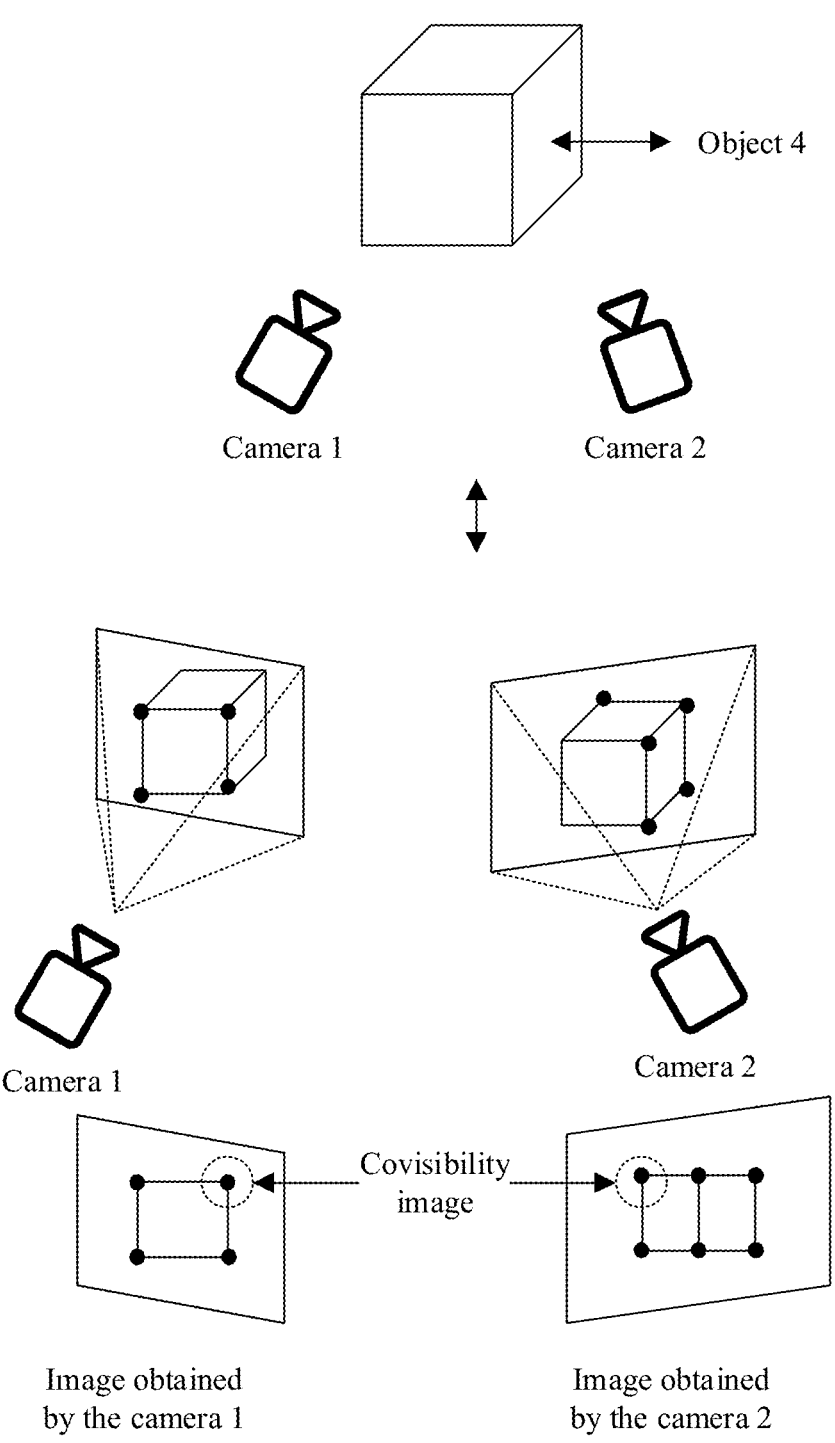
FIG. 2 is a diagram of an example of a distance measurement principle of multi-view cameras according to an embodiment.

FIG. 2 is a diagram of an example of a distance measurement principle of multi-view cameras according to an embodiment of this application.

As shown in FIG. 2, when a covisibility image of a camera 1 and a camera 2 includes the object 2, images shot by the two cameras may be combined to restore depth information of the object in the image. Then, a distance between the object and an electronic device is determined.

The camera 1 and the camera 2 have different poses, and intrinsic parameters and relative poses of the camera 1 and the camera 2 are known. In this case, projection matrices of different cameras may be separately determined, to restore coordinates of the covisibility image in a world coordinate system. The world coordinate system is a coordinate system established by the electronic device, and is used to describe a relative position relationship between different objects in real space.

For example, if the intrinsic parameter of the camera 1 is $K_1$, and an extrinsic parameter of the camera 1 in FIG. 2 is $T_1$, the projection matrix of the camera 1 is $P_1=K_1T_1$. Similarly, if the intrinsic parameter of the camera 1 is $K_2$, and an extrinsic parameter of the camera 1 in FIG. 2 is $T_2$, the projection matrix of the camera 1 is $P_2=K_2T_2$.

The covisibility image may be determined through image matching, to determine that coordinates of the covisibility image in an image coordinate system or a pixel coordinate system of the camera 1 are $x_1$, and coordinates of the covisibility image in an image coordinate system or a pixel coordinate system of the camera 2 are $x_2$. In addition, the coordinates of the covisibility image in the world coordinate system are set to X. In this case, $$P_1 = T_{cam1}^{cam2} P_2.$$

Therefore, the following formula (1) can be obtained:

$$\begin{cases} P_1 X = x_1 = T_{cam1}^{cam2} P_2 X \\ P_2 X = x_2 \end{cases} \tag{1}$$

X may be obtained by solving formula (1), so that the distance between the object in the covisibility image and the electronic device can be determined.

Optionally, in some embodiments of this application, the intrinsic parameters of the two cameras may be the same, that is, $P_1=P_2$; or in some embodiments of this application, the intrinsic parameters of the two cameras may be different. It should be noted that an intrinsic parameter of any one of the two cameras may change. For a camera in which an intrinsic parameter can be changed through optical zoom or the like, although the intrinsic parameter of the camera may change, the intrinsic parameter of the camera is still fixed after zoom, and the electronic device may know whether a focal length range of the camera changes. Therefore, it may be considered that whether the electronic device can obtain the distance depends on whether the electronic device can determine $$T_{cam1}^{cam2}.$$

In addition, $$T_{cam1}^{cam2}$$

further affects a range or a plind region, a distance measurement range, and distance measurement precision of the electronic device, as shown in the following content in FIG. 3, FIG. 4, and FIG. 5.

It should be noted that the distance between the electronic device and the object may be directly obtained according to formula (1), and coordinates of the object in the world coordinate system do not need to be obtained first.

After the relative poses of the camera 1 and the camera 2 change, $$T_{cam1}^{cam2}$$

needs to be re-calibrated, so that the distance between the object and the electronic device can be determined.

$$T_{cam1}^{cam2}$$

affects the distance measurement range and the distance measurement precision due to a limitation of a capability of a pixel in a pixel coordinate system or an image coordinate system to represent a nearby object and a distant object. Second, considering that a field of view of the camera is limited, $$T_{cam1}^{cam2}$$

further affects the range of the blind region or a range of the covisibility image.

To further describe importance of $$T_{cam1}^{cam2},$$

the following uses two cameras with a same intrinsic parameter and parallel optical axes as an example to describe impact of relative poses of the cameras on a distance measurement range and distance measurement precision.

Figure 3:
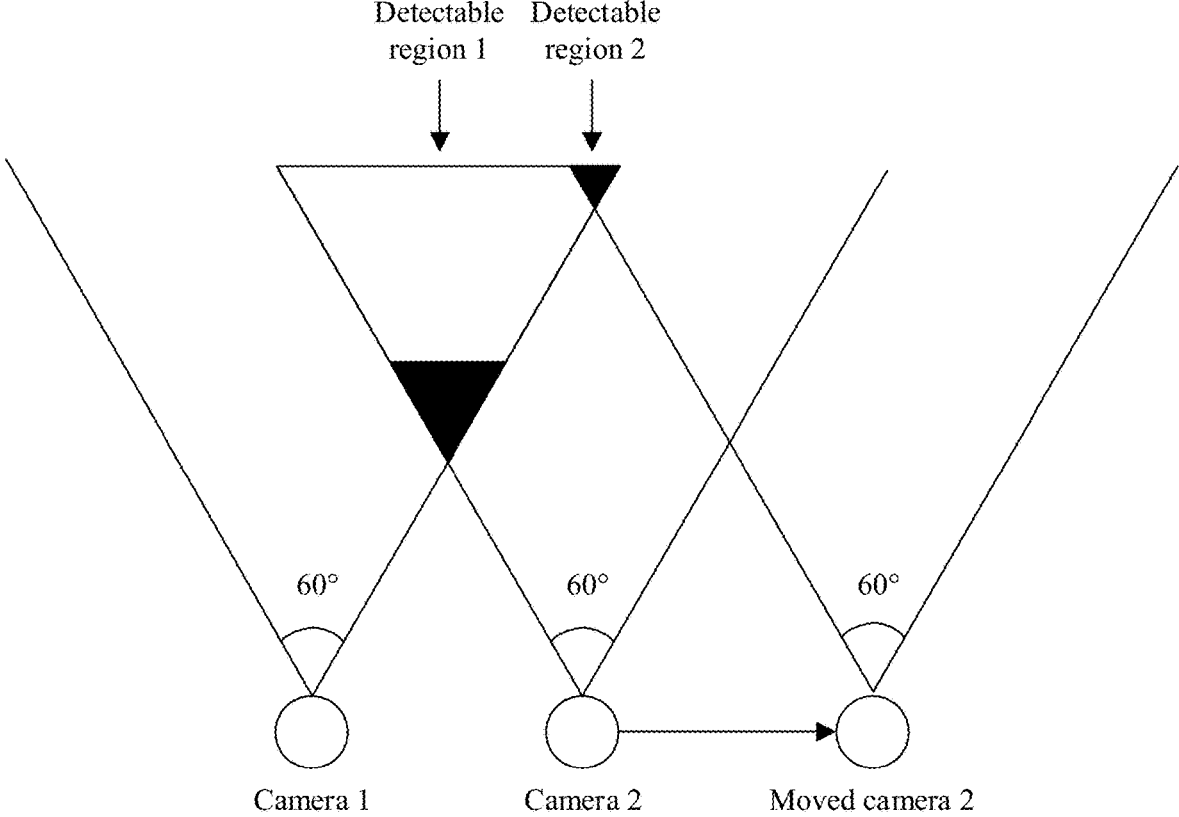
FIG. 3 is a diagram of an example in which relative poses affect a distance measurement blind region according to an embodiment.

FIG. 3 is a diagram of an example in which relative poses affect a distance measurement blind region according to an embodiment of this application.

If the intrinsic parameters of the camera 1 and the camera 2 are the same, and optical axes are parallel, after the camera 2 is translated to enable a distance between an optical center of the camera 1 and an optical center of the camera 2 to become longer, a detectable region of the electronic device is far away from the electronic device, and a nearby blind region becomes larger.

In FIG. 3, horizontal fields of view of both the camera 1 and the camera 2 are 60°, and the detectable region of the electronic device before the camera 1 and the camera 2 are away from each other is a detectable region 1. After the camera 2 is translated, the distance between the optical center of the camera 1 and the optical center of the camera 2 becomes longer, and the detectable region of the electronic device becomes a detectable region 2. A distance between the detectable region 2 and the electronic device is longer than that between the detectable region 1 and the electronic device, and a blind region of the detectable region 2 is greater than a blind region of the detectable region 1 at close range.

Figure 4:
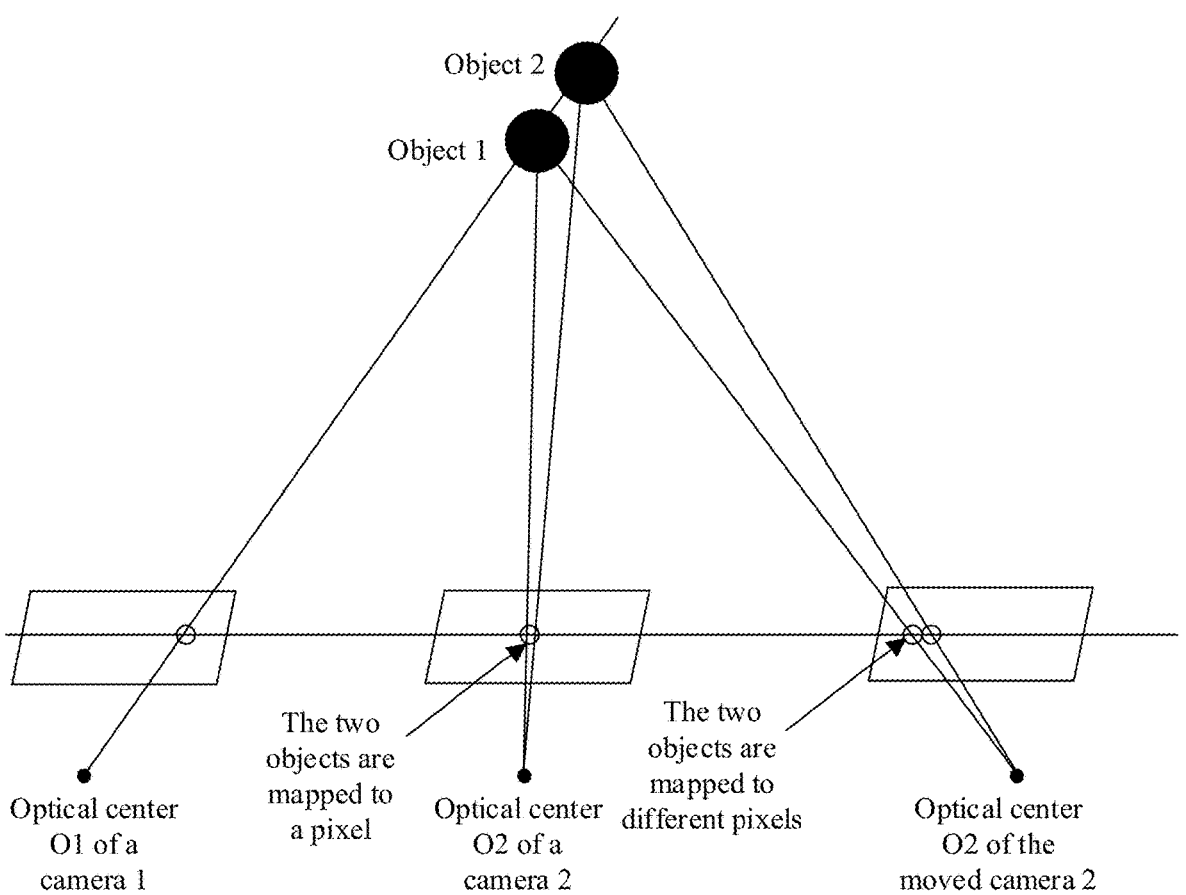
FIG. 4 is a diagram of an example in which relative poses affect a distance measurement range according to an embodiment.

FIG. 4 is a diagram of an example in which relative poses affect a distance measurement range according to an embodiment of this application.

As shown in FIG. 4, before the camera 2 moves, the distance between the optical center of the camera 1 and the optical center of the camera 2 is short. In this case, the distant objects are mapped to a same pixel in a pixel plane or an image plane of the camera 2. In other words, it is considered that distances between the object 1 and the camera 2 and between the object 2 and the camera 2 are the same.

As shown in FIG. 4, after the camera 2 moves, the distance between the optical center of the camera 1 and the optical center of the camera 2 is long. In this case, the distant objects are mapped to different pixels in the pixel plane or the image plane of the camera 2. In other words, it is considered that the distances between the object 1 and the camera 2 and between the object 2 and the camera 2 can be distinguished.

If the optical axes of the two cameras are parallel, it may be considered that the distance between the optical centers of the two cameras affects the distance measurement precision. In a more general case, the relative poses of the two cameras affect the distance measurement precision.

Figure 5:
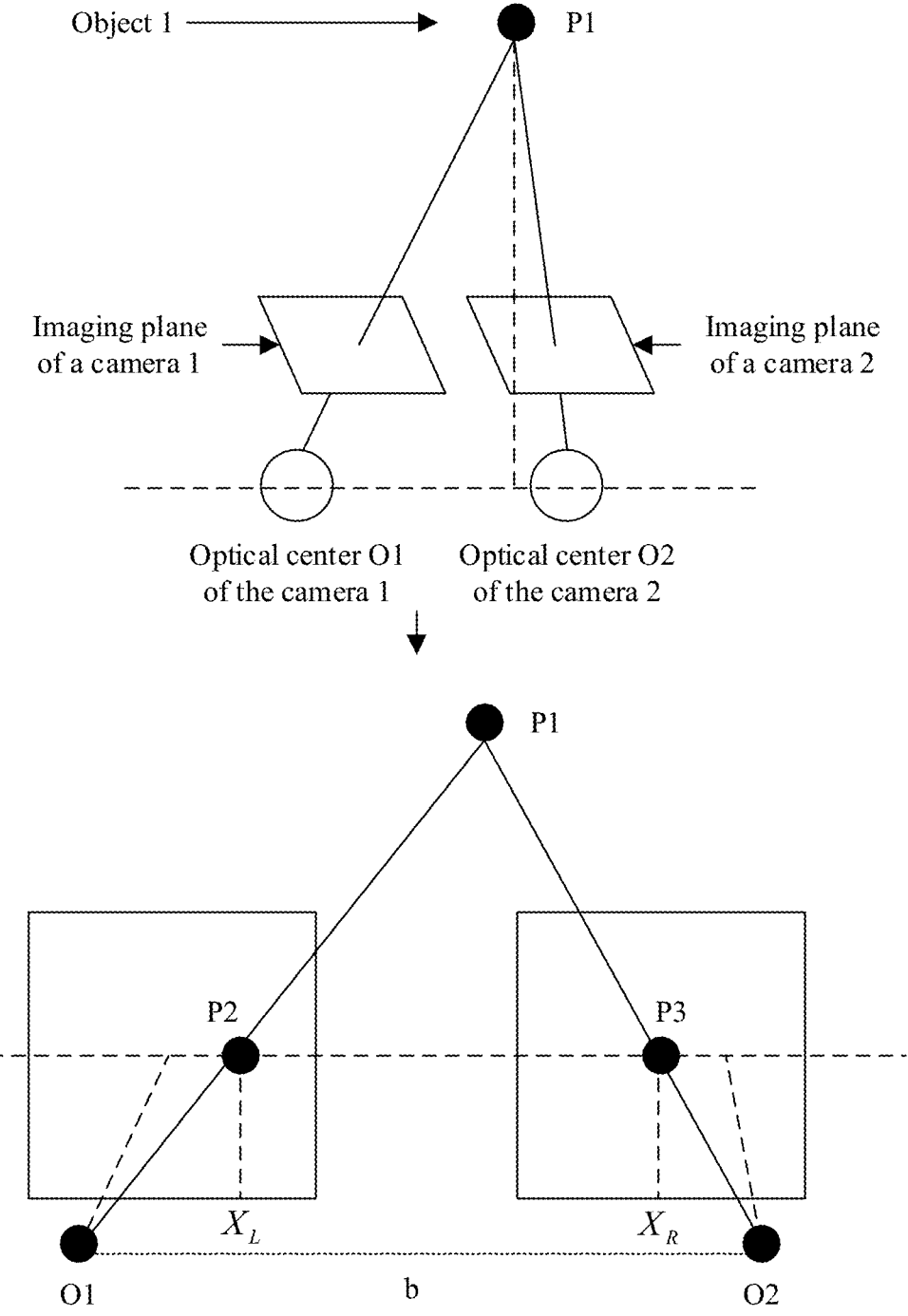
FIG. 5 is a diagram of an example of a dual-view distance measurement principle according to an embodiment.

FIG. 5 is a diagram of an example of a dual-view distance measurement principle according to an embodiment of this application.

As shown in FIG. 5, the object 1 may be considered as a mass point $P_1$. On an imaging plane of the camera 1, that is, in the pixel coordinate system or the image coordinate system of the camera 1, a mapping point is $P_2$, and a corresponding horizontal coordinate is $X_L$. On an imaging plane of the camera 2, that is, in the pixel coordinate system or the image coordinate system of the camera 2, a mapping point is $P_3$, and a corresponding horizontal coordinate is $X_R$.

In this case, $D=X_L-X_R$, where D is parallax. In this case, $$z = \frac{fb}{D},$$

where z is a depth, namely, a distance between the object and the electronic device, f is a focal length, and b is a distance between the two optical centers.

With reference to the content in FIG. 3 and FIG. 4, it may be clearly determined that the relative poses of the cameras affect the distance measurement precision and a position of the detectable region. To adapt to distance measurement requirements of the electronic device in different scenarios, relative poses of different cameras may be adjusted. The position of the detectable region directly determines the distance measurement range and the range of the blind region.

After relative poses of two or more cameras change, the relative poses of the two or more cameras need to be determined, to jointly process two images. The relative poses of the two or more cameras need to be determined by using a calibration method. For example, in the content shown in FIG. 5, the electronic device needs to determine the distance between the optical centers of the two cameras, to determine the distance between the object and the electronic device.

However, a common calibration method, for example, Zhang Zhengyou calibration method, depends on a specific calibration object, for example, a checkerboard, and calibration cannot be performed in real time. Alternatively, a calibration method, for example, structure from motion (SFM) or simultaneous localization and mapping (SLAM), an object in an environment is static, and precision of a calibrated parameter is low. As a result, an error in determining a distance between the object and an electronic device is large, and this error is unacceptable for other electronic devices, such as a vehicle, that are directly related to life and property safety of a user.

Therefore, embodiments of this application provide a multi-view distance measurement method and an electronic device. According to the multi-view distance measurement method provided in this embodiment of this application, first, driving information of a vehicle and a position of a region of interest need to be determined; second, an appropriate pose is selected from a plurality of preset poses based on the position of the region of interest, and relative poses of multi-view cameras are adjusted based on the appropriate pose; and finally, parameters such as a distance and content of the region of interest are determined based on images shot by the multi-view cameras.

Because the pose is preset, when the multi-view cameras are in the preset pose, relative poses of any two cameras in the multi-view cameras can be determined without performing self-calibration by the electronic device. This reduces a calculation amount. In addition, compared with relative poses determined through self-calibration, the relative poses of the two cameras in the preset pose are pre-calibrated, and therefore have high precision. Because precision of the relative pose is high, distance precision of the region of interest determined based on the images shot by the multi-view cameras is also high. In addition, the electronic device may further use the pre-calibrated relative pose as an initial value, and the initial value is quickly converged to an optimal value by using a projection matrix, so that the relative pose is optimized, to obtain a more accurate relative pose.

The following describes, by using an example, a multi-view distance measurement method provided in embodiments of this application.

Figure 6:
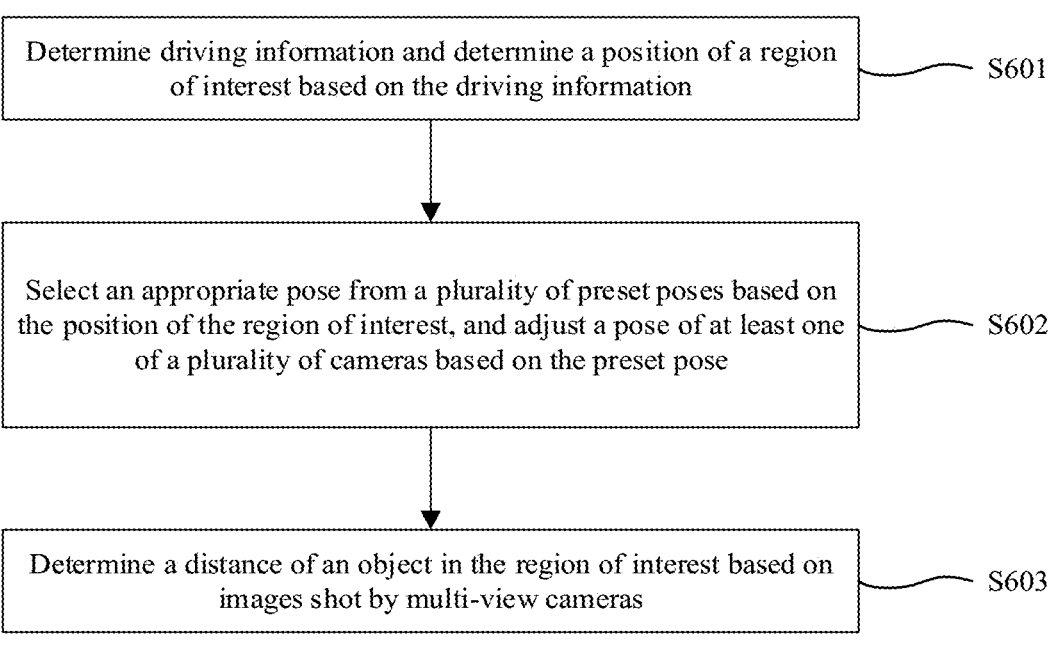
FIG. 6 is a diagram of an example of a multi-view distance measurement method according to an embodiment.

FIG. 6 is a diagram of an example of a multi-view distance measurement method according to an embodiment of this application.

The multi-view distance measurement method provided in this embodiment of this application includes step S601, step S602, and step S603.

S601: Determine driving information and determine a position of a region of interest based on the driving information.

The driving information includes a traveling speed, a gear, a traveling environment, a driving mode, and the like of a vehicle. The determining a position of a region of interest mainly includes determining an angle, a distance, and the like of the region of interest.

The traveling speed may be an instantaneous speed of the vehicle, or may be an average speed, or may be a traveling speed whose duration exceeds a rated time, or the like.

A higher traveling speed or a higher gear indicates a longer distance that the vehicle travels within a same time. Therefore, a higher traveling speed indicates a larger distance range of interest. For example, if the traveling speed is within 0 km/h to 30 km/h, an electronic device determines that the distance range of the region of interest is 0 m to 30 m; if the traveling speed is within 30 km/h to 60 km/h, the electronic device determines that the distance range of interest is 20 m to 60 m; and if the traveling speed is within 60 km/h to 90 km/h, the electronic device determines that the distance range of interest is 50 m to 120 m.

Positions of regions of interest that need to be noticed by a driver or the electronic device may vary with different traveling environments. For example, in a high-speed traveling environment or the like, the distance range of the region of interest is 50 m to 200 m; in an urban or a countryside traveling environment or the like, the distance range of interest is 30 m to 150 m; and in a school or an industrial park or another traveling environment, the distance range of interest is 10 m to 50 m. For another example, in a high-speed traveling environment or the like, an angle range of an azimuth of the region of interest is 10° to –10°; in an urban or a countryside traveling environment or the like, the angle range of the azimuth of the region of interest is 20° to –20°; and in a school or an industrial park or another traveling environment, the angle range of the azimuth of the distance range of interest is 40° to –40°. For another example, in a scenario in which the vehicle waits for the green light at an intersection, an angle range of a pitch angle of the region of interest is 0° to 60°.

The traveling environment may be determined in a plurality of manners. This is not limited herein. For example, the electronic device may obtain image data such as a red, green, and blue (RGB) image or a three-dimensional (3D) point cloud by using a sensor, for example, a camera, and then determine the traveling environment based on the image data. For another example, the electronic device may determine the traveling environment based on positioning data and map data.

Positions of regions of interest of the vehicle may also vary with different driving modes. For example, when the vehicle is in a navigation mode, the distance of the region of interest is long; when the vehicle is in a cruise mode, a vehicle fleet mode, or a vehicle follow mode, the distance of the region of interest is short; and when the vehicle is in an automatic parking mode or a reverse mode, the distance of the region of interest is shortest.

It should be noted that the foregoing example of a correspondence between the traveling speed and the position of the region of interest is merely an example for description. There may be another correspondence between the traveling speed and the distance range of the region of interest, or the traveling speed may be related to an angle of the region of interest. Similarly, different gears may also have different correspondences with the positions of the regions of interest.

It should be noted that the foregoing example of a correspondence between the traveling environment and the position of the region of interest is merely an example for description. Different traveling environments may alternatively have different correspondences with the positions of the regions of interest.

It should be noted that the foregoing example of a correspondence between the driving mode and the position of the region of interest is merely an example for description. Different driving modes may alternatively have different correspondences with the positions of the regions of interest.

Optionally, in some embodiments of this application, the electronic device may comprehensively consider the driving information such as a traveling speed, a gear, a traveling environment, and a driving mode, to determine the position of the region of interest. For example, a rule may be preset on the electronic device, and the position of the region of interest may be determined based on the rule and the driving information. In other words, H (driving information)=position of a region of interest, where H ( ) is a function corresponding to the rule.

S602: Select an appropriate pose from a plurality of preset poses based on the position of the region of interest, and adjust a pose of at least one of a plurality of cameras based on the preset pose.

After the position of the region of interest is determined, the appropriate pose may be selected from the plurality of preset poses, and at least one of the plurality of cameras is moved to the appropriate pose. Different poses correspond to different detectable regions. The appropriate pose is selected from the plurality of preset poses, so that a detectable region corresponding to the appropriate pose includes the region of interest.

The plurality of cameras may include a front-facing camera, a rear-facing camera, and a camera configured on a side surface. For example, in an automatic parking mode or a reverse mode, cameras whose poses need to be adjusted include the rear-facing camera. For another example, in a high-speed traveling environment or the like, cameras whose poses need to be adjusted include the front-facing camera.

It should be noted that intrinsic parameters of the plurality of cameras may be the same or may be different.

It should be noted that, a transformation matrix, for example, $$T_{cam1}^{cam2},$$

corresponding to any one of the plurality of preset poses is pre-stored in the electronic device; or a transformation matrix corresponding to any one of the plurality of preset poses is stored on a server, and the electronic device may obtain, by using a network, the transformation matrix corresponding to any pose.

Figure 7A:
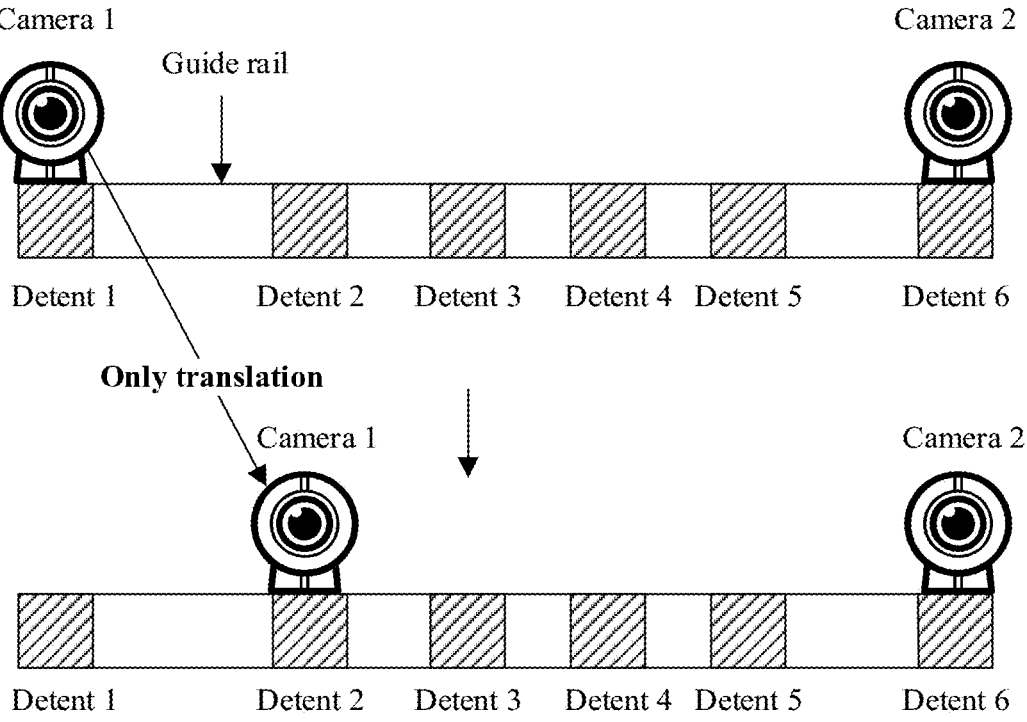
FIG. 7A and FIG. 7B are diagrams of an example of moving a camera to an appropriate pose according to an embodiment.
Figure 7B:
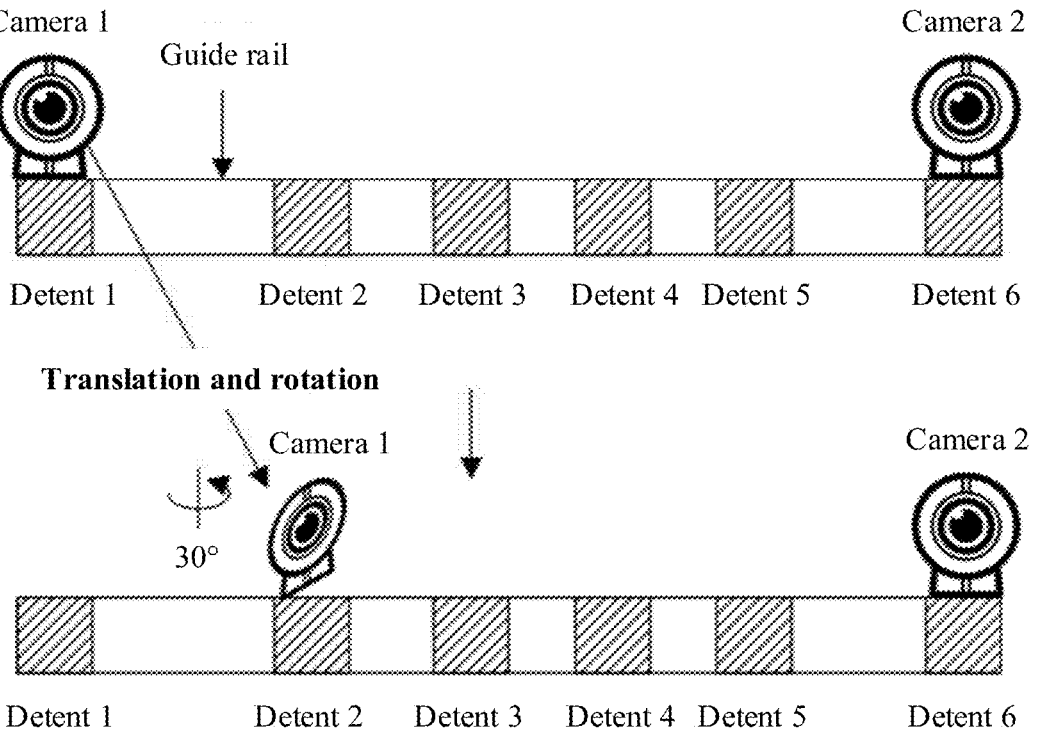

FIG. 7A and FIG. 7B are diagrams of an example of moving a camera to an appropriate pose according to an embodiment of this application.

For example, the plurality of cameras, including a camera 1 and a camera 2, are mounted on a guide rail of the electronic device. The guide rail has a plurality of detents, which respectively correspond to different poses. One detent may correspond to a plurality of poses. In other words, one detent may be used to adjust a posture of the camera. Different detents may be used to adjust a spatial position of the camera.

For example, a detent 1, a detent 2, a detent 3, a detent 4, a detent 5, and a detent 6 shown in FIG. 7A and FIG. 7B respectively correspond to different poses. As shown in FIG. 7A, the electronic device may move the camera 1 from the detent 1 to the detent 2 through the guide rail. The move may change only a spatial position of the camera 1.

In the content shown in FIG. 7A, if the camera 1 is located in the detent 1, and the camera 2 is located in the detent 6, a spacing between the two cameras is 30 cm, and a distance of a detection range is greater than 200 m. If the camera 1 is located in the detent 2, and the camera 2 is located in the detent 6, the spacing between the two cameras is 25 cm, and the distance of the detection range is 100 m to 200 m. If the camera 1 is located in the detent 3, and the camera 2 is located in the detent 4, the spacing between the two cameras is 8 cm, and the distance of the detection range is less than 100 m.

As shown in FIG. 7B, the electronic device may move the camera 1 from the detent 1 to the detent 2 through the guide rail. The move may change the spatial position and a posture of the camera 1. In FIG. 7B, the camera 1 is translated and horizontally rotates by 30°.

It should be noted that another apparatus for changing a pose of a camera may alternatively be mounted on the electronic device, and is not limited to a guide rail and a detent.

FIG. 8A to FIG. 8D are diagrams of another example of moving a camera to an appropriate pose according to an embodiment of this application.

Figure 8A:
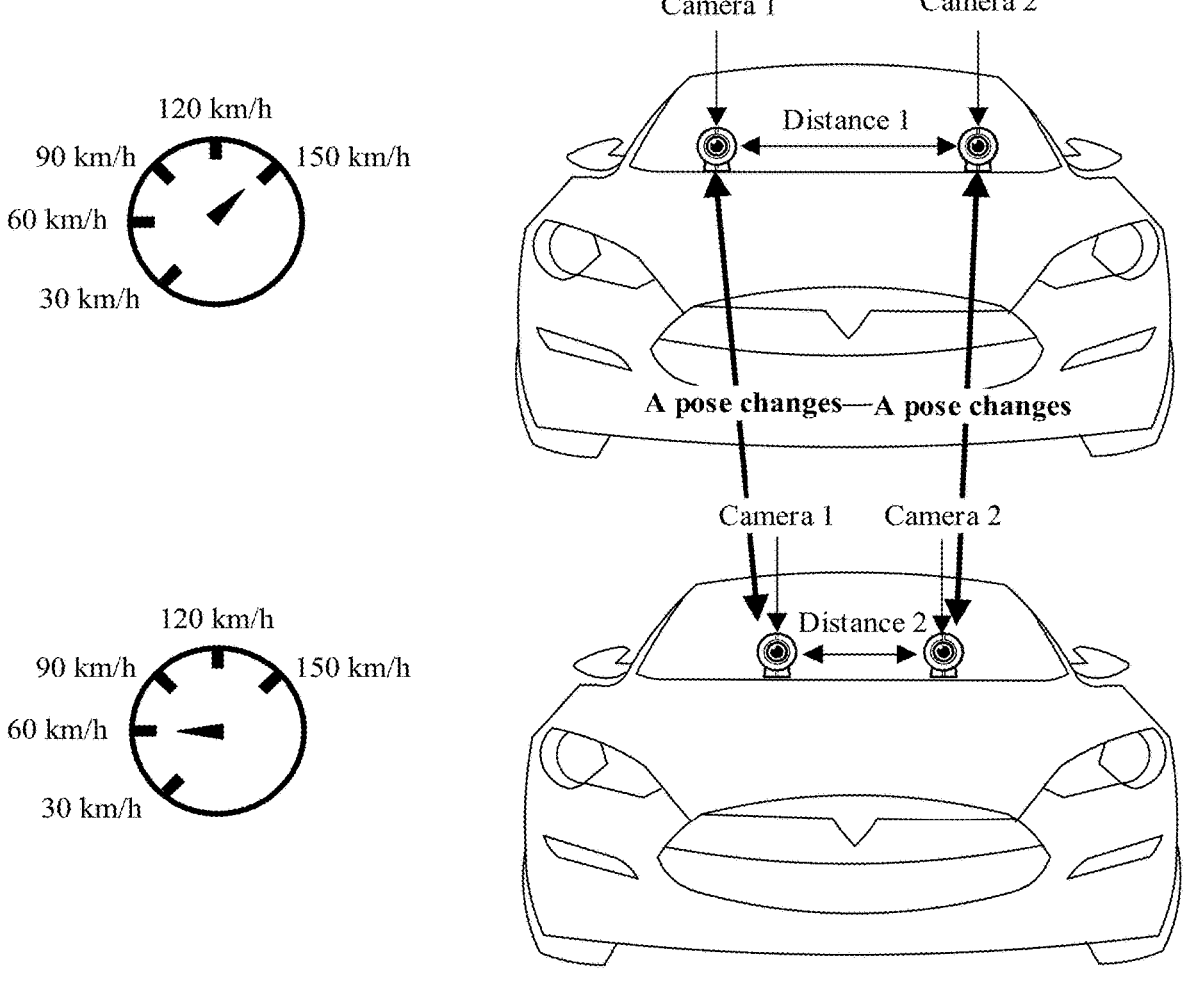
FIG. 8A to FIG. 8D are diagrams of another example of moving a camera to an appropriate pose according to an embodiment.
Figure 8B:
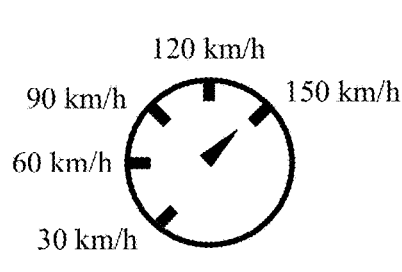
Figure 8B:
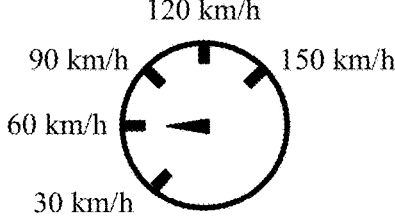
Figure 8B:
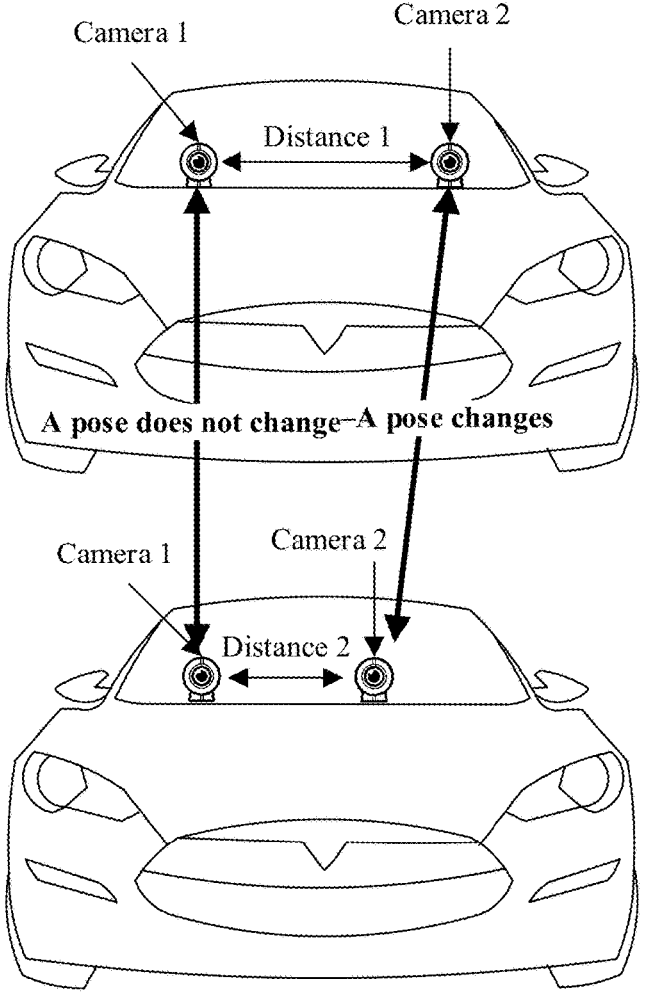
Figure 8C:
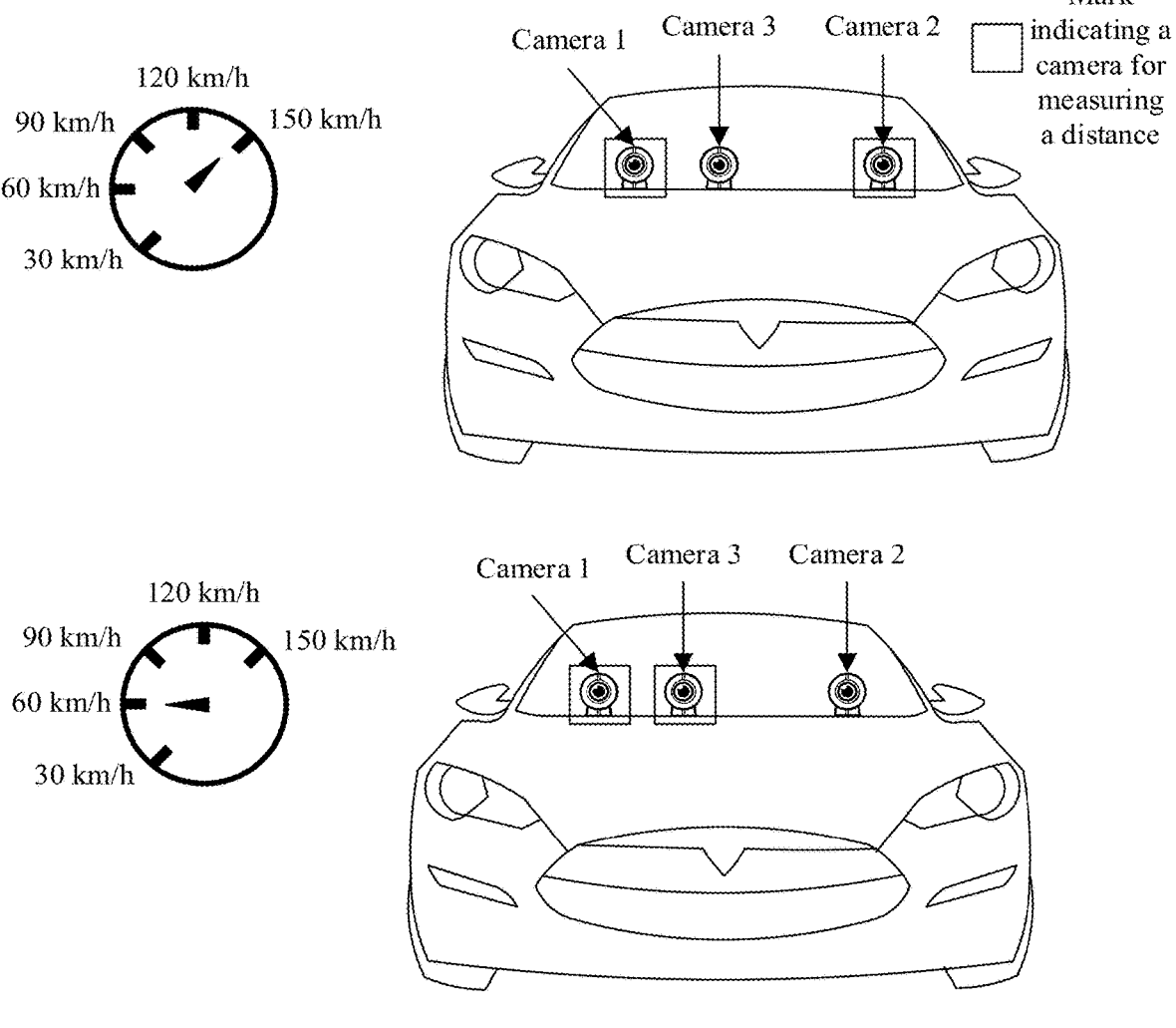

In FIG. 8A to FIG. 8C, optical axes of the cameras on the electronic device are parallel. As shown in FIG. 8A, when the vehicle travels at a speed of 150 km/h, the spacing between the camera 1 and the camera 2 is a distance 1; and when the vehicle travels at a speed of 60 km/h, the spacing between the camera 1 and the camera 2 is a distance 2. The distance 2 is less than the distance 1.

In the content shown in FIG. 8A, when the spacing between the camera 1 and the camera 2 is reduced, a distance of the detectable region is reduced, and a nearby blind region is also reduced.

In the content shown in FIG. 8B, different from the content shown in FIG. 8A, after the speed of the vehicle decreases from 150 km/h to 60 km/h, the electronic device moves the camera 2, so that the distance between the camera 2 and the camera 1 becomes the distance 2.

In the content shown in FIG. 8B, because a pose of the camera 1 does not change, moving only a pose of the camera 2 helps maintain consistency between world coordinate systems of the plurality of cameras and the world coordinate system of the electronic device, and further helps maintain a unified reference coordinate system between the camera and another type of sensor, for example, a lidar or a module, for example, a navigation module. This helps implement fusion of a plurality of sensors. The reference coordinate system is a coordinate system for reference used to measure relative positions of the electronic device and an object other than the electronic device, and may be a world coordinate system.

In the content shown in FIG. 8C, different from the content shown in FIG. 8A and FIG. 8B, the electronic device may be configured with more than two cameras. As shown in FIG. 8C, the vehicle is configured with three cameras: a camera 1, a camera 2, and a camera 3. When the vehicle travels at a speed of 150 km/h, the electronic device performs distance measurement based on images obtained by the camera 1 and the camera 2. When the vehicle travels at a speed of 60 km/h, the electronic device performs distance measurement based on images obtained by the camera 1 and the camera 3.

It should be noted that in the content shown in FIG. 8C, different speed ranges may correspond to different combinations of the cameras.

Optionally, in some embodiments of this application, a pose of one or more of the plurality of cameras on the electronic device may not change, and a pose of at least one camera may change.

Figure 8D:
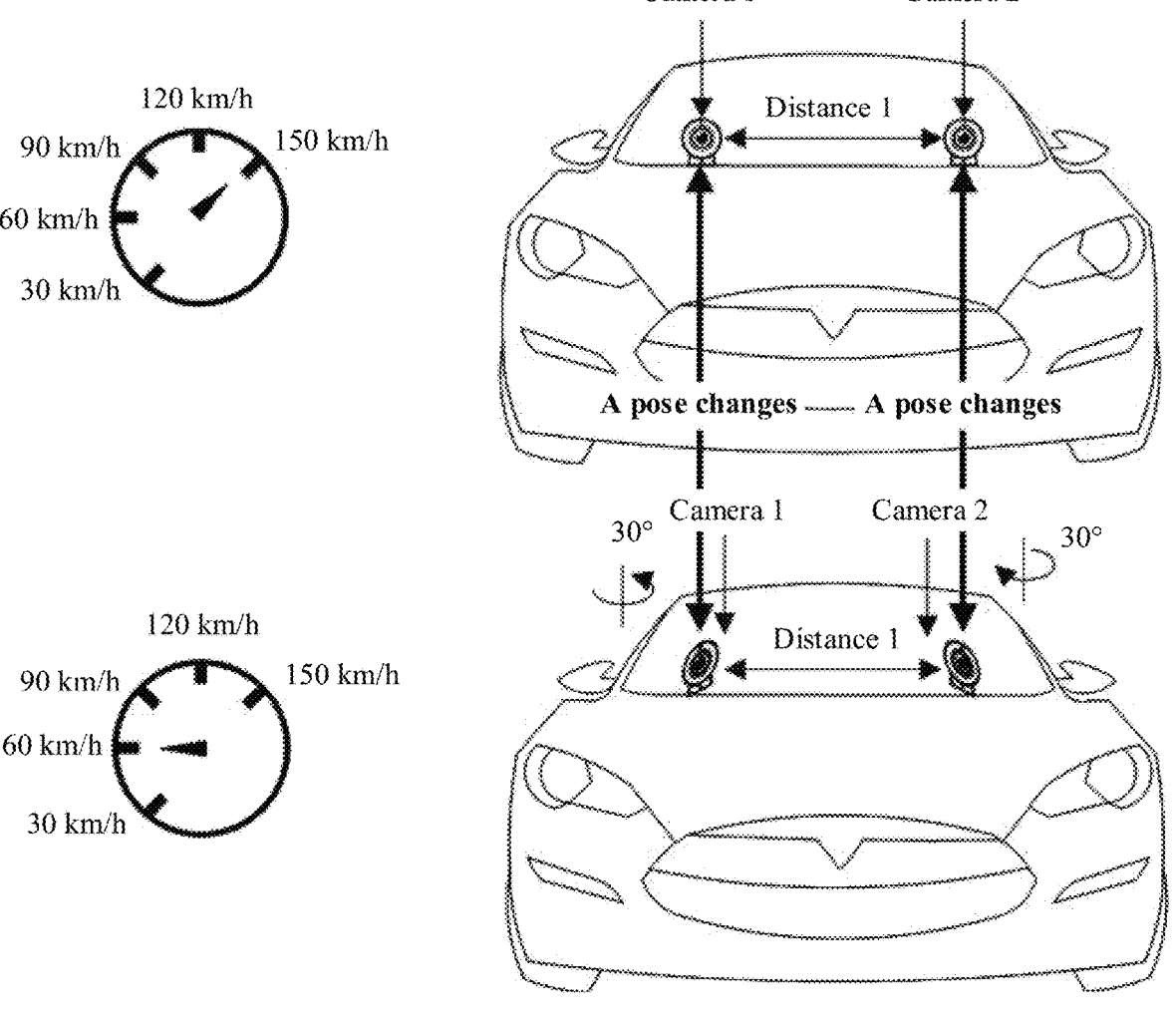

In the content shown in FIG. 8D, after the speed of the vehicle decreases from 150 km/h to 60 km/h, the distance between the two cameras on the electronic device does not change, and postures of the cameras change. The camera 1 rotates rightward by 30°, and the camera 2 rotates leftward by 30°.

It should be noted that in the content shown in FIG. 8A, FIG. 8B, FIG. 8C, and FIG. 8D, relative poses of different cameras are known in all cases.

It should be noted that in the content shown in FIG. 8C, the electronic device may change a pose of any camera.

It should be noted that, in a more general case, the optical axes of the cameras on the electronic device may not be parallel, or postures of the cameras on the electronic device are different.

Optionally, in some embodiments of this application, after the pose of the camera changes, relative poses of the camera and the electronic device may be updated, to unify reference coordinate systems of all sensors or modules on the electronic device. For example, in the content shown in FIG. 8A, the world coordinate systems of the camera 1 and the camera 2 may be modified to be the same as the world coordinate system of the electronic device based on relative position relationships between the camera 1 and the electronic device and between the camera 2 and the electronic device, to unify all reference coordinate systems of all sensors or modules on the electronic device. For another example, in the content shown in FIG. 8B, the camera 1 may be used as reference coordinate systems of all cameras, that is, the world coordinate system of the camera 1 is used for reference. Therefore, after a relative pose of the camera 2 changes, relative poses of the camera and the electronic device do not need to be updated, and a reference coordinate system of the camera 2 is still the same as that of the electronic device.

It should be noted that, because the electronic device knows the pose of the camera, a conversion relationship between the world coordinate system of the camera and the world coordinate system of the electronic device may be determined, so that the world coordinate systems of the camera and the electronic device can be unified. In other words, the camera and the electronic device have a unified reference coordinate system. In other words, the camera and another sensor on the electronic device have a same reference coordinate system.

Optionally, in some embodiments of this application, after relative poses of any two cameras are known, the relative poses of the two cameras may be optimized according to a self-calibration algorithm, to determine more accurate relative poses of the two cameras. Compared with directly determining the relative poses of the two cameras according to the self-calibration algorithm, a manner of using the preset relative poses of the two cameras as initial values for optimization after the relative poses are known can have the values quickly converged to optimal values, so that more accurate relative poses of the two cameras can be quickly determined.

Figure 9:
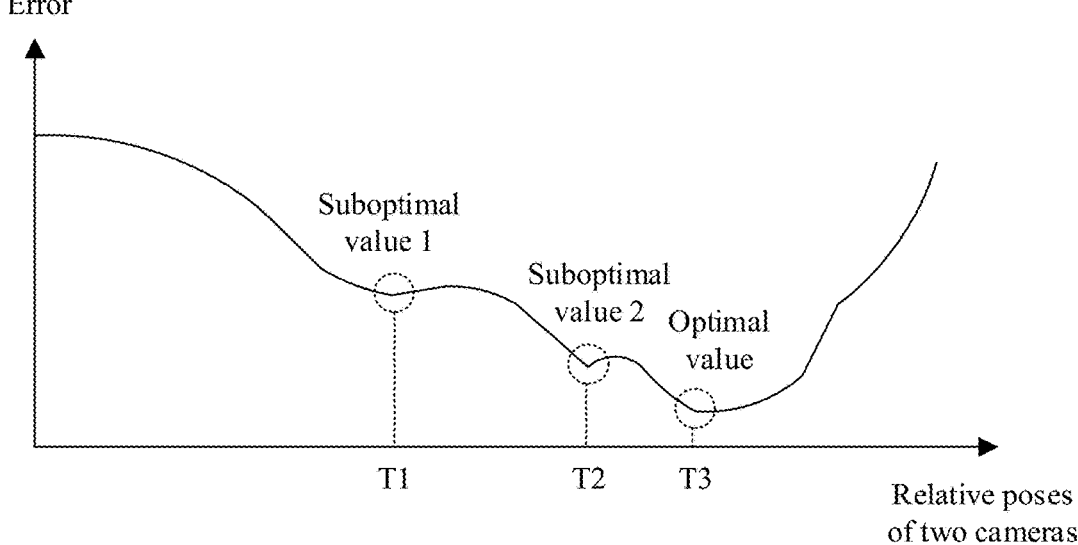
FIG. 9 is a diagram of an example of determining more accurate relative poses of two cameras according to an embodiment.

FIG. 9 is a diagram of an example of determining more accurate relative poses of two cameras according to an embodiment of this application.

As the self-calibration algorithm is an optimization algorithm, the self-calibration algorithm may inevitably cause a failure to converge a pose to the optimal value. However, in this embodiment of this application, because the electronic device knows the relative poses of the two cameras, even if there is a specific deviation between the known relative poses of the two cameras and actual relative poses due to limited precision of a mechanical apparatus, the relative poses of the two cameras may also be quickly determined according to the self-calibration algorithm.

The self-calibration algorithm may be considered as minimization of a projection error. The projection error is an error in projecting a covisibility image of the two cameras from a pixel coordinate system or an image coordinate system of one camera to a pixel coordinate system or an image coordinate system of the other camera. In other words, the projection matrix may be considered as a matrix corresponding to a relative pose.

As shown in FIG. 9, if the relative poses of the two cameras are unknown, but calibration is performed according to the self-calibration algorithm, the self-calibration algorithm may enable the relative pose to be converged to a suboptimal value 1 or a suboptimal value 2. If the relative poses of the two cameras are known, the known relative poses may be used as initial values of the optimization algorithm, and the initial values are close to optimal values, so that the self-calibration algorithm can definitely enable the initial values to be converged to the optimal values. In addition, because the initial values are close to the optimal values, a convergence speed of the self-calibration algorithm can be increased, and calibration can be implemented.

It should be noted that, in this embodiment of this application, in a self-calibration process, an intrinsic parameter of any one of the two cameras may be known or unknown.

S603: Determine a distance of an object in the region of interest based on images shot by multi-view cameras.

After the electronic device obtains the images shot by the multi-view cameras, because the electronic device has determined relative poses of any two cameras in the multi-view cameras, the distance between the object in the region of interest and the electronic device may be determined.

For a manner of determining the distance between the object in the region of interest and the electronic device, refer to the content shown in FIG. 2 and FIG. 5. Details are not described herein again.

Finally, a hardware architecture and a software architecture of the electronic device provided in embodiments of this application are described.

Figure 10:
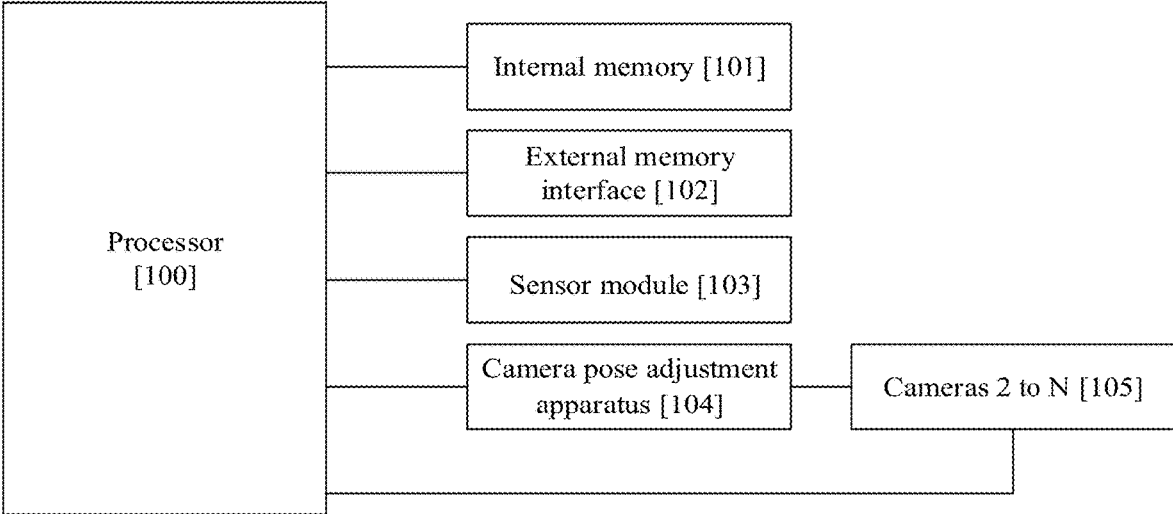
FIG. 10 is a diagram of an example of a hardware architecture of an electronic device according to an embodiment.

FIG. 10 is a diagram of an example of a hardware architecture of an electronic device according to an embodiment of this application.

The electronic device may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, a vehicle-mounted device, a smart household device, and/or a smart city device. A specific type of the electronic device is not limited in this embodiment of this application. For example, the electronic device may be a vehicle, an intelligent robot, or the like. The electronic device has at least two cameras and an apparatus for adjusting a pose of the camera.

The electronic device may include a processor 100, an internal memory 101, an external memory interface 102, a sensor module 103, a camera pose adjustment apparatus 104, and cameras 105.

It may be understood that the structure illustrated in this embodiment of the present disclosure does not constitute any specific limitation on the electronic device. In some other embodiments of this application, the electronic device may include more or fewer components than those shown in the figure, or some components may be combined, or some components may be split, or there may be a different component arrangement. The components shown in the figure may be implemented by hardware, software, or a combination of software and hardware.

The processor 100 may include one or more processing units. For example, the processor 100 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on instruction operation code and a time sequence signal, to complete control of instruction reading and instruction execution.

A memory may be further disposed in the processor 100, and is configured to store instructions and data. In some embodiments, the memory in the processor 100 is a cache memory. The memory may store instructions or data recently used or cyclically used by the processor 100. If the processor 100 needs to use the instructions or the data again, the processor 100 may directly invoke the instructions or the data from the memory. This avoids repeated access, reduces a waiting time of the processor 100, and improves system efficiency.

It may be understood that an interface connection relationship between the modules illustrated in this embodiment of the present disclosure is merely an example for description, and does not constitute any limitation on a structure of the electronic device. In some other embodiments of this application, the electronic device may alternatively use an interface connection manner different from that in the foregoing embodiment, or use a combination of a plurality of interface connection manners.

The camera 105 is configured to capture a static image or a video. An optical image of an object is generated through a lens, and is projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or image luminance (Y) and chrominance (U and V) (YUV). In some embodiments, the electronic device may include two or N cameras 105, where N is a positive integer greater than 2.

The internal memory 101 may include one or more random access memories (RAMs) and one or more non-volatile memories (NVMs).

The random access memory may include a static random access memory (SRAM), a dynamic random access memory (DRAM), a synchronous dynamic random access memory (SDRAM), a double data rate synchronous dynamic random access memory (DDR SDRAM, for example, a fifth generation DDR SDRAM (DDR5 SDRAM)), and the like.

The non-volatile memory may include a magnetic disk storage device and a flash memory.

The flash memory may be NOR flash, NAND flash, a 3D NAND flash, and the like according to an operation principle; may be a single-level cell (SLC), a multi-level cell (MLC), a triple-level cell (TLC), a quad-level cell (QLC), and the like based on a quantity of electric potential levels of a cell; or may be a universal flash storage (UFS), an embedded multimedia card (eMMC), and the like according to storage specifications.

The random access memory may be directly read and written by using the processor 100. The random access memory may be configured to store an executable program (for example, machine instructions) in an operating system or another running program, and may be further configured to store data of a user, data of an application, and the like.

The non-volatile memory may also store an executable program, data of a user, data of an application, and the like, which may be loaded into the random access memory in advance, to be directly read and written by the processor 100.

The external memory interface 102 may be configured to connect to an external non-volatile memory, to extend a storage capability of the electronic device. The external non-volatile memory communicates with the processor 100 through the external memory interface 102, to implement a data storage function. For example, files such as music and videos are stored in the external non-volatile memory.

The sensor module 103 may include a pressure sensor, a gyroscope sensor, a barometric pressure sensor, a magnetic sensor, an acceleration sensor, a distance sensor, an optical proximity sensor, a temperature sensor, a touch sensor, an ambient light sensor, and the like.

The camera pose adjustment apparatus may adjust a pose of the camera 105. For example, the camera pose adjustment apparatus may be a guide rail with a plurality of detents.

In this embodiment of this application, the internal memory 101 or the memory in the processor 100 stores a relative pose relationship of the cameras and detection ranges of the cameras in different relative pose relationships. After determining a region of interest, the processor 100 may determine, based on a relationship between the detection range of the camera and the region of interest, how to adjust a relative pose of the camera.

In this embodiment of this application, after adjusting the relative pose of the camera, the processor 100 may re-unify reference coordinate systems or world coordinate systems of the sensor module 103 and the camera 105.

A software system of the electronic device may use a layered architecture, an event-driven architecture, a micro-kernel architecture, a microservice architecture, or a cloud architecture.

Figure 11:
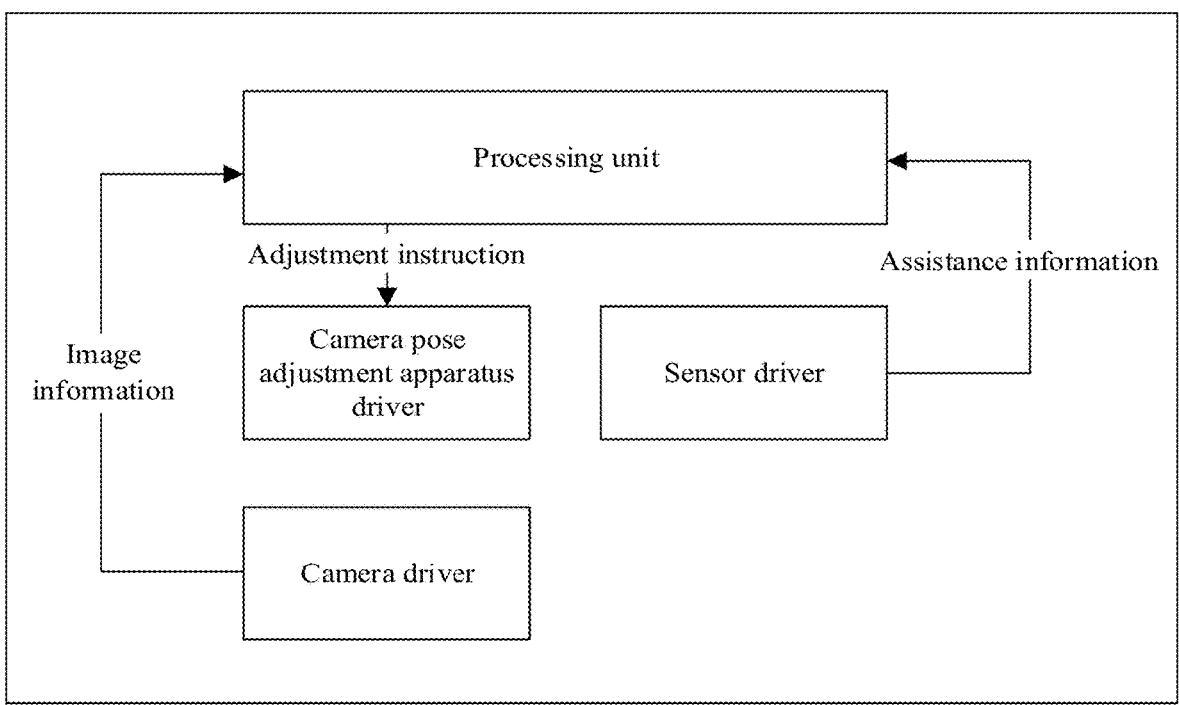
FIG. 11 is a diagram of an example of a software architecture of an electronic device according to an embodiment.

FIG. 11 is a diagram of an example of a software architecture of an electronic device according to an embodiment of this application.

As shown in FIG. 11, the software architecture of the electronic device includes a camera pose adjustment apparatus driver, a sensor driver, and a camera driver.

A processing unit may send an adjustment instruction to the camera pose adjustment apparatus driver, to adjust a relative pose of a camera.

The sensor driver may send assistance information to the processing unit. The assistance information is used to determine driving information. For example, the assistance information may be a vehicle speed, a gear, a positioning result, or the like.

The camera driver may send image information to the processing unit. The image information may be used to determine a distance between an object in a region of interest and the electronic device, and the image information may be further used to determine the driving information.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by software, hardware, firmware, or any combination thereof. When software is used to implement embodiments, all or some of the foregoing embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state drive), or the like.

A person of ordinary skill in the art may understand that all or some of the procedures of the methods in embodiments may be implemented by a computer program instructing related hardware. The program may be stored in a computer-readable storage medium. When the program is executed, the procedures in the method embodiments may be performed. The foregoing storage medium includes any medium that can store program code, such as a read-only memory (ROM), a RAM, a magnetic disk, or an optical disc.

The invention claimed is:

1. A method comprising:
   determining a region of interest based on driving information, wherein the driving information comprises at least one of a speed, a gear, a traveling environment, or a driving mode;

determining a first relative pose from a plurality of relative poses based on the driving information, the region of interest, and correspondences between a plurality of detectable regions and the relative poses, wherein the relative poses are preset, wherein the correspondences are preset on an electronic device, and wherein a first detectable region of the detectable regions and corresponding to the first relative pose comprises the region of interest;
   adjusting at least one of a first pose of a first camera of the electronic device or a second pose of a second camera of the electronic device to the first relative pose;
   obtaining a first image from the first camera;
   obtaining a second image from the second camera; and
   determining a first distance based on the first image, the second image, and the first relative pose,
   wherein the first distance is between an object and the electronic device.

2. The method of claim 1, wherein after adjusting the first pose or the second pose and before determining the first distance, the method further comprises updating the first relative pose.

3. The method of claim 2, wherein updating the first relative pose comprises updating the first relative pose by using a matrix corresponding to the first relative pose as a projection matrix to optimize calibration of the first relative pose.

4. The method of claim 1, wherein adjusting the first pose or the second pose comprises changing a first spatial position of the first camera with respect to the second camera or changing a second spatial position of the second camera with respect to the first camera.

5. The method of claim 1, wherein adjusting the first pose or the second pose comprises rotating or changing an orientation of the first camera or the second camera.

6. The method of claim 1, wherein the plurality of relative poses are relative camera poses that define spatial relationships between the first camera and the second camera.

7. The method of claim 6, wherein each of the relative camera poses corresponds to a transformation matrix that is pre-stored in the electronic device.

8. The method of claim 1, wherein adjusting at least one of the first pose of the first camera or the second pose of the second camera to the first relative pose comprises changing a baseline distance between the first camera and the second camera.

9. A method comprising:
   adjusting, when a speed of an electronic device is within a first range, relative poses of a first camera and a second camera to a first pose, wherein the first pose belongs to a plurality of relative poses, and wherein the relative poses are preset; and
   adjusting, when the speed of the electronic device is within a second range, the relative poses to a second pose,
   wherein the second pose belongs to the relative poses, and
   wherein when a lower limit of the first range is greater than an upper limit of the second range, a first distance between a first detectable region corresponding to the first pose and the electronic device is greater than a second distance between a second detectable region corresponding to the second pose and the electronic device.

10. The method of claim 9, wherein adjusting the relative poses to the first pose comprises adjusting a first baseline distance between the first camera and the second camera to a second baseline distance, wherein adjusting the relative poses to the second pose comprises adjusting the first baseline distance to a third baseline distance, and wherein the second baseline distance is greater than the third baseline distance.

11. The method of claim 10 further comprising:
adjusting, when the speed of the electronic device is within a third range, the relative poses to a third pose, wherein the third pose belongs to the relative poses, and wherein adjusting the relative poses to the third pose comprises adjusting a fourth baseline distance between the first camera and a third camera to a fifth baseline distance; and
selecting a first pair of the first camera and the second camera or a second pair of the first camera and the third camera based on the speed.

12. The method of claim 9, wherein adjusting the first pose or the second pose comprises changing a spatial position of the first camera or a spatial position of the second camera with respect to the first camera.

13. The method of claim 9, wherein adjusting the at least one of the first pose or the second pose comprises rotating or changing an orientation of the first camera or the second camera.

14. The method of claim 9, wherein the first pose is different from the second pose.

15. An electronic device comprising:
at least two cameras comprising:
a first camera; and
a second camera;
a memory configured to store instructions; and
one or more processors coupled to the memory and configured to execute the instructions to cause the electronic device to:
determine a region of interest based on driving information, wherein the driving information comprises at least one of a speed, a gear, a traveling environment, or a driving mode;
determine a first relative pose from a plurality of relative poses based on the driving information, the region of interest, and correspondences between a plurality of detectable regions and the relative poses, wherein the relative poses are preset, wherein the correspondences are preset on an electronic device, and wherein a first detectable region of the detectable regions and corresponding to the first relative pose comprises the region of interest;
adjust at least one of a first pose of the first camera or a second pose of the second camera to the first relative pose;
obtain a first image from the first camera;
obtain a second image from the second camera; and
determine a first distance based on the first image, the second image, and the first relative pose,
wherein the first distance is between an object and the electronic device.

16. The electronic device of claim 15, wherein the one or more processors are further configured to execute the instructions to cause the electronic device to update the first relative pose after adjusting the at least one of the first pose or the second pose and before determining the first distance.

17. The electronic device of claim 16, wherein the one or more processors are further configured to execute the instructions to cause the electronic device to update the first relative pose by using a matrix corresponding to the first relative pose as a projection matrix to optimize calibration of the first relative pose.

18. The electronic device of claim 15, wherein adjusting the first pose or the second pose comprises changing a spatial position of the first camera with respect to the second camera or changing a second spatial position of the second camera with respect to the first camera.

19. The electronic device of claim 15, wherein adjusting the first pose or the second pose comprises rotating or changing an orientation of the first camera or the second camera.

20. The electronic device of claim 15, further comprising a camera pose adjustment apparatus configured to physically adjust at least one of the first pose of the first camera or the second pose of the second camera, wherein the camera pose adjustment apparatus comprises at least one of a guide rail with detents, a motor, or an actuator.

* * * * *